US011723133B2

(12) United States Patent
Kanbara (10) Patent No.: US 11,723,133 B2
(45) Date of Patent: Aug. 8, 2023

(54) LIGHT-EMITTING ELEMENT DRIVING SEMICONDUCTOR INTEGRATED CIRCUIT, LIGHT-EMITTING ELEMENT DRIVING DEVICE, LIGHT-EMITTING DEVICE, AND VEHICLE

(71) Applicant: Rohm Co., Ltd., Kyoto (JP)

(72) Inventor: Daisuke Kanbara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/880,200

(22) Filed: Aug. 3, 2022

(65) Prior Publication Data

US 2023/0061314 A1 Mar. 2, 2023

(30) Foreign Application Priority Data

Sep. 1, 2021 (JP) .................................. 2021-142264

(51) Int. Cl.
| | | |
|---|---|---|
| *H05B 45/34* | (2020.01) | |
| *H05B 45/395* | (2020.01) | |
| *H05B 45/54* | (2020.01) | |
| *F21S 41/141* | (2018.01) | |

(52) U.S. Cl.
CPC ........... *H05B 45/34* (2020.01); *H05B 45/395* (2020.01); *H05B 45/54* (2020.01); *F21S 41/141* (2018.01)

(58) Field of Classification Search
CPC ...... H05B 45/34; H05B 45/395; H05B 45/54; F21S 41/141
See application file for complete search history.

(56) References Cited

U.S. PATENT DOCUMENTS

| | | | |
|---|---|---|---|
| 2015/0334802 A1* | 11/2015 | Ryu ....................... | H05B 45/48 315/193 |
| 2017/0354008 A1* | 12/2017 | Eum .................... | H05B 45/385 |
| 2018/0192491 A1* | 7/2018 | Liu ...................... | H05B 45/395 |

FOREIGN PATENT DOCUMENTS

JP 2013-047047 3/2013

* cited by examiner

*Primary Examiner* — Anne M Hines
(74) *Attorney, Agent, or Firm* — Fish & Richardson P.C.

(57) ABSTRACT

A light-emitting element driving semiconductor integrated circuit that constitutes at least a portion of a light-emitting element driving device configured to drive a plurality of light-emitting elements connected in series includes: a controller configured to have a first mode in which switching control is performed on a transistor connected in series to the plurality of light-emitting elements and a second mode in which linear control is performed on the transistor; and a first detector configured to detect that a current flowing through a sense resistor connected in series to the plurality of light-emitting elements and the transistor reaches a threshold value, wherein the controller switches from the switching control to the linear control based on an output of the first detector.

8 Claims, 8 Drawing Sheets

FIG. 10 ical Field

LIGHT-EMITTING ELEMENT DRIVING SEMICONDUCTOR INTEGRATED CIRCUIT, LIGHT-EMITTING ELEMENT DRIVING DEVICE, LIGHT-EMITTING DEVICE, AND VEHICLE

CROSS-REFERENCE TO RELATED APPLICATION

This application is based upon and claims the benefit of priority from Japanese Patent Application No. 2021-142264, filed on Sep. 1, 2021, the entire contents of which are incorporated herein by reference.

TECHNICAL FIELD

The present disclosure relates to a light-emitting element driving semiconductor integrated circuit. Further, the present disclosure relates to a light-emitting element driving device, and to a light-emitting device and a vehicle using the same.

BACKGROUND

A headlamp of an automobile is configured to be switchable between a state for radiating a low beam as a passing beam and a state for radiating a high beam, which reaches farther ahead than the low beam, as a driving beam.

In the related art, an example of a light-emitting device for use as a headlamp of an automobile is disclosed. The light-emitting device (LED (Light-Emitting Diode) lighting circuit) disclosed in the related art includes a plurality of light-emitting elements connected in series, and is configured to light all the light-emitting elements when the headlamp is in the state for radiating the driving beam, and short-circuit a part of light-emitting elements such that only the remaining light-emitting elements are lit when the headlamp is in the state for radiating the passing beam.

In the light-emitting device (LED lighting circuit) disclosed in Patent Document 1, an output voltage of a DC-DC converter that drives the light-emitting elements drops when switching from the state where it is the headlight for traveling to the state where it is the headlight for passing. Due to this drop in the output voltage, electric charges stored in an output capacitor of the DC-DC converter are released from the output capacitor, and an output current of the DC-DC converter temporarily becomes an overcurrent, which temporarily flows through an LED that is not short-circuited. That is, when switching from the state of being the headlight for traveling to the state of being the headlight for passing, the LED that is not short-circuited is damaged.

In the related art, when switching from the state of being the headlight for traveling to the state of being the headlight for passing, the LED is short-circuited in two steps to lower the output voltage of the above-mentioned DC-DC converter in two steps to reduce the overcurrent.

However, the light-emitting device (LED lighting circuit) disclosed in the related art only reduces a degree of overcurrent, and does not arrive at a fundamental solution to the overcurrent. Therefore, it is necessary to experimentally find optimum values of a value of a predetermined output voltage Va obtained by the output voltage drop in the first stage and a value of maintenance time t1 for maintaining the predetermined output voltage Va, through cut-and-try so that the overcurrent can be surely reduced to a desired value. Since the optimum values of Va and t1 vary with changes in specifications of the LEDs or individual variations of LEDs, it is difficult, with the light-emitting device (LED lighting circuit) disclosed in the related art, to guarantee that the overcurrent can be reduced to the desired value.

In addition to the above-mentioned switching from the high beam to the low beam, for example, in vehicle lamp control, even when performing control for sequentially lighting a plurality of light-emitting elements, control for sequentially turning off a plurality of light-emitting elements, control for animation-lighting a plurality of matrix-arranged light-emitting elements, control for ADB (Adaptive Driving Beam)—lighting a plurality of light-emitting elements, and the like, the number of light-emitting elements lighted may be reduced to cause a large current to flow through the light-emitting elements. Further, for example, when some of the plurality of light-emitting elements have a ground fault, a large current may flow through the remaining light-emitting elements that have no ground fault.

SUMMARY

A light-emitting element driving semiconductor integrated circuit according to an embodiment of the present disclosure constitutes at least a portion of a light-emitting element driving device configured to vary the number of light-emitting elements to be lit among a plurality of light-emitting elements connected in series. The light-emitting element driving semiconductor integrated circuit includes: a controller configured to have a first mode in which switching control is performed on a transistor connected in series to the plurality of light-emitting elements and a second mode in which linear control is performed on the transistor; and a first detector configured to detect that a current flowing through a sense resistor connected in series to the plurality of light-emitting elements and the transistor reaches a threshold value, wherein the controller switches from the switching control to the linear control based on an output of the first detector A light-emitting element driving device according to another embodiment of the present disclosure is configured to drive a plurality of light-emitting elements connected in series. The light-emitting element driving device includes: a transistor connected in series to the plurality of light-emitting elements; a controller configured to have a first mode in which switching control is performed on the transistor and a second mode in which linear control is performed on the transistor; a sense resistor connected in series to the plurality of light-emitting elements and the transistor; and a first detector configured to detect that a current flowing through the sense resistor reaches a threshold value, wherein the controller switches from the switching control to the linear control based on an output of the first detector.

A light-emitting device according to another embodiment of the present disclosure is configured to include the light-emitting element driving device of the aforementioned configuration, and the plurality of light-emitting elements.

A vehicle according to another embodiment of the present disclosure includes the light-emitting device of the aforementioned configuration

DETAILED DESCRIPTION

In the present disclosure, a MOS (Metal Oxide Semiconductor) field effect transistor refers to a field effect transistor having a gate structure including at least three layers including "a layer made of a conductor or a semiconductor such as polysilicon having a small resistance value," an "insulating layer," and "a P-type, N-type, or intrinsic semiconductor layer." That is, the gate structure of the MOS field effect transistor is not limited to the three-layer structure of metal, oxide, and semiconductor.

In the present disclosure, a reference voltage means a voltage that is constant in an ideal state, and is actually a voltage that may fluctuate slightly due to a temperature change or the like.

<Light-Emitting Device>

Figure 1:
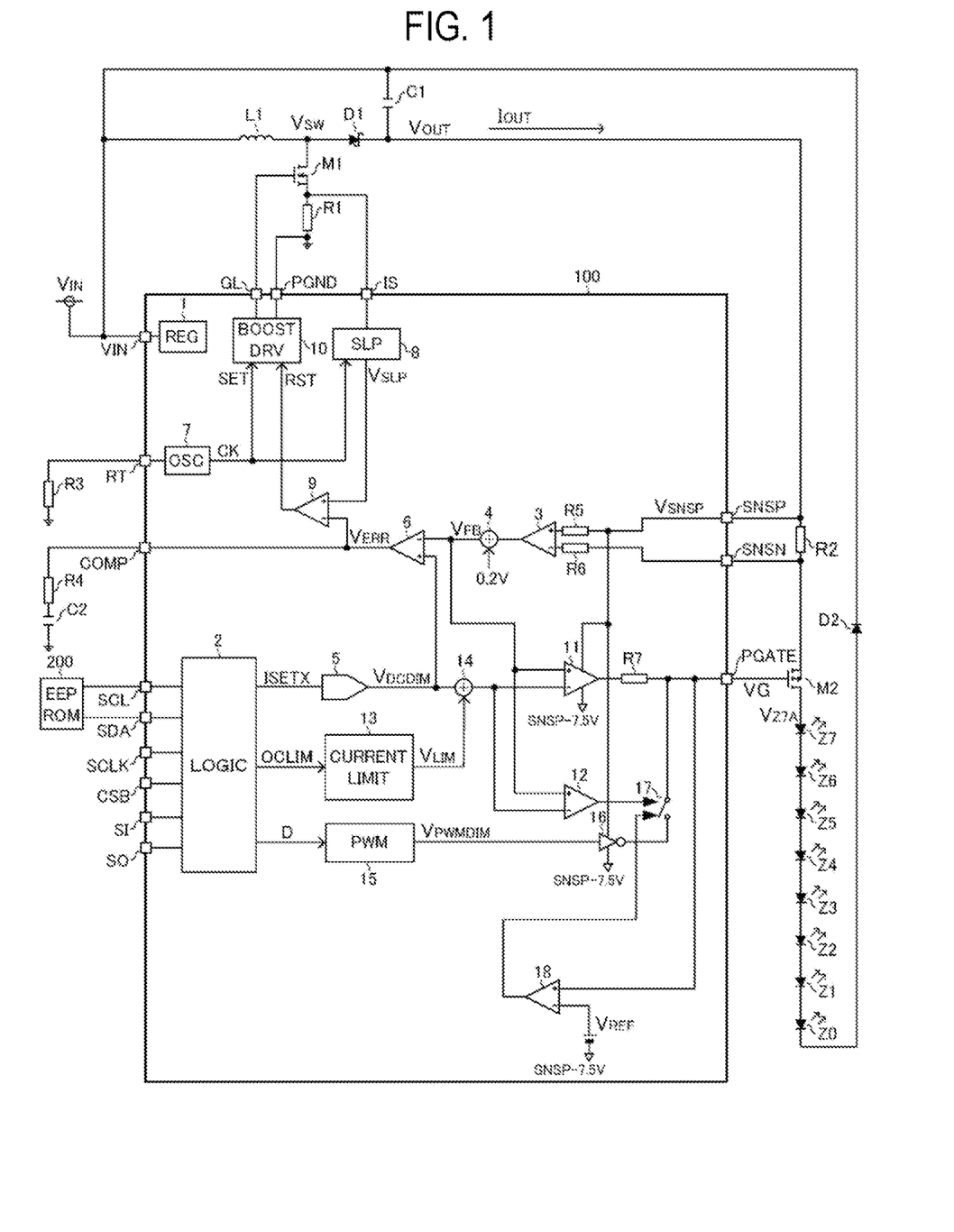
FIG. 1 is a diagram showing a configuration example of a light-emitting device.

FIG. 1 is a diagram showing a configuration example of a light-emitting device. The light-emitting device shown in FIG. 1 includes a light-emitting element driving IC 100. The light-emitting device shown in FIG. 1 includes light-emitting diodes Z0 to Z7, which are light-emitting elements, and a light-emitting element driving device configured to drive the light-emitting elements. The light-emitting element driving device includes the light-emitting element driving IC 100.

The above-mentioned light-emitting element driving device further includes an inductor L1, an N-channel type MOS field effect transistor (hereinafter referred to as an NMOS transistor) M1 which is a switching element, a Schottky barrier diode D1, and an output capacitor C1.

The inductor L1, the NMOS transistor M1, the Schottky barrier diode D1, and the output capacitor C1 constitute a step-up/down type DC/DC converter. The DC/DC converter converts a DC input voltage $V_{IN}$ into a DC output voltage $V_{OUT}$.

The above-mentioned light-emitting element driving device further includes sense resistors R1 and R2, a P-channel type MOS field effect transistor (hereinafter referred to as a PMOS transistor) M2, light-emitting diodes Z0 to Z7, a diode D2, a capacitor C2, resistors R3 and R4, and an EEPROM (Electrically Erasable Programmable Read Only Memory) 200.

Figure 2:
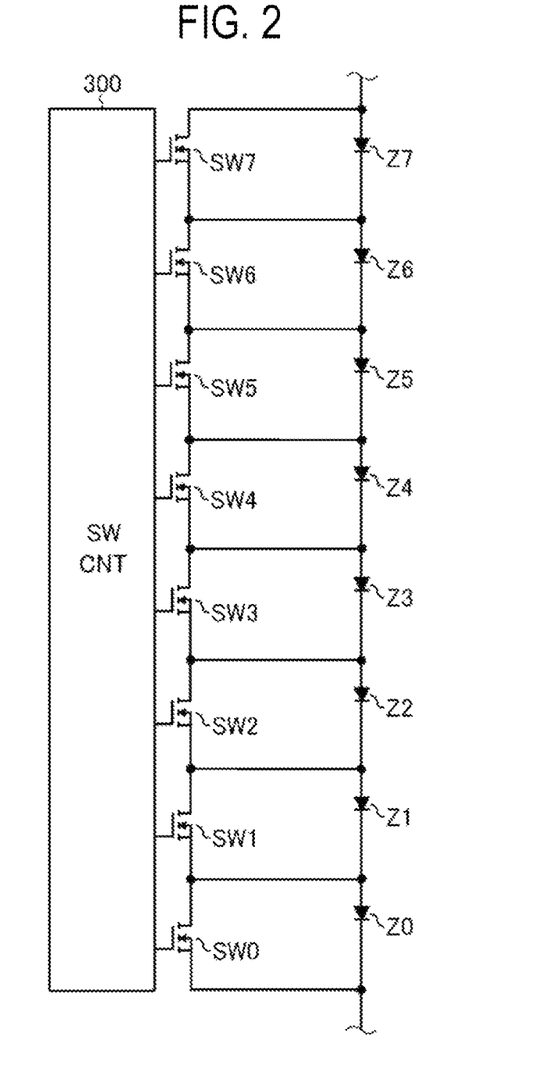
FIG. 2 is a diagram showing a configuration example of a switch and a switch control circuit.

The above-mentioned light-emitting element driving device further includes switches SW0 to SW7 (see FIG. 2, not shown in FIG. 1) and a switch control circuit 300 (see FIG. 2, not shown in FIG. 1).

The light-emitting element driving IC 100 is a semiconductor integrated circuit device (so-called LED driver IC) in which a constant voltage circuit 1, a logic circuit 2, an operational amplifier 3, an adder 4, a DAC (Digital Analog Converter) 5, an error amplifier 6, an oscillator 7, a slope circuit 8, a comparator 9, a step-up drive circuit 10, an operational amplifier 11, a comparator 12, a current-limiting circuit 13, an adder 14, a PWM (Pulse Width Modulation) circuit 15, an inverter 16, a switch 17, a comparator 18, and resistors R5 to R7 are integrated.

The operational amplifier 11, the comparator 12, the inverter 16, the switch 17, and the resistor R7 function as a controller configured to have a first mode in which switching control is performed on the PMOS transistor M2 and a second mode in which linear control is performed on the PMOS transistor M2.

The comparator 12 functions as a first detector configured to detect that a current flowing through the sense resistor R2 reaches a threshold value. That is, in the present embodiment, the controller and the first detector share the comparator 12.

The comparator 18 functions as a second detector configured to detect that a gate-source voltage of the PMOS transistor M2 reaches a predetermined value.

Further, the light-emitting element driving IC 100 includes a terminal VIN, a terminal GL, a terminal PGND, a terminal IS, a terminal SNSP, a terminal SNSN, a terminal PGATE, a terminal SO, a terminal SI, a terminal CSB, a terminal SCLK, a terminal SDA, a terminal SCL, a terminal COMP, and a terminal RT to establish electrical connections with the outside.

The input voltage $V_{IN}$ is supplied to the terminal VIN, one end of the inductor L1, one end of the output capacitor C1, and the cathode of the diode D2. The other end of the inductor L1 is connected to the drain of the NMOS transistor M1 and the anode of the Schottky barrier diode D1. The source of the NMOS transistor M1 is connected to one end of the sense resistor R1 and the terminal IS. The other end of the sense resistor R1 is connected to the ground potential and the terminal PGND. The gate of the NMOS transistor M1 is connected to the terminal GL. A rectangular wave switch voltage $V_{SW}$ is generated at the other end of the inductor L1 by switching the NMOS transistor M1.

The cathode of the Schottky barrier diode D1 is connected to the other end of the output capacitor C1, one end of the sense resistor R2, and the terminal SNSP. The output voltage $V_{OUT}$ is generated at the other end of the output capacitor C1. The output voltage $V_{OUT}$ is a smoothed switch voltage $V_{SW}$.

The other end of the sense resistor R2 is connected to the source of the PMOS transistor M2 and the terminal SNSN. The gate of the PMOS transistor M2 is connected to the terminal PGATE. The drain of the PMOS transistor M2 is connected to the anode of the series circuit of the light-emitting diodes Z0 to Z7.

The cathode of the series circuit of the light-emitting diodes Z0 to Z7 is connected to the anode of the diode D2. The cathode of the diode D2 is connected to the terminal VIN. An example of the diode D2 may include a Schottky barrier diode.

One end of the resistor R3 for setting a clock frequency is connected to the terminal RT. The other end of the resistor R3 is connected to the ground potential.

One end of the resistor R4 is connected to the terminal COMP. The other end of the resistor R4 is connected to the ground potential via the capacitor C2 for phase compensation.

The constant voltage circuit 1 generates a constant voltage $V_{REG}$ by using the input voltage $V_{IN}$ supplied to the terminal VIN and supplies the same to each part of the light-emitting element driving IC 100.

The logic circuit 2 performs dimming control and the like based on the settings stored in the EEPROM 200. The logic circuit 2 outputs a current set value ISETX, an overcurrent limit value OCLIM, and a duty value D. The logic circuit 2 performs so-called DC dimming control by changing the current set value ISETX. The logic circuit 2 performs so-called PWM dimming control by changing the duty value D.

The non-inverting input terminal of the operational amplifier 3 is connected to the terminal SNSP via the resistor R5, and the inverting input terminal of the operational amplifier 3 is connected to the terminal SNSN via the resistor R6. The operational amplifier 3 outputs a voltage corresponding to a voltage across the sense resistor R2.

An output voltage of the operational amplifier 3 is offset by the adder 4 to increase by 0.2 V. A feedback voltage $V_{FB}$ generated by the adder 4 is supplied to the inverting input terminal of the error amplifier 6, the non-inverting input terminal of the operational amplifier 11, and the non-inverting input terminal of the comparator 12. The feedback voltage $V_{FB}$ is a voltage based on a current output from the DC/DC converter and flowing through the sense resistor R2.

The DAC 5 converts the current set value ISETX into a DC dimming voltage $V_{DCDIM}$ which is an analog voltage. The DC dimming voltage $V_{DCDIM}$ is supplied to the non-inverting input terminal of the error amplifier 6.

The error amplifier 6 generates an error voltage VERA corresponding to a difference between the feedback voltage $V_{FB}$ and the DC dimming voltage $V_{DCDIM}$.

The oscillator 7 generates a clock signal CK. The clock frequency of the clock signal CK is determined by the resistance value of the resistor R3 connected to the terminal RT. The clock signal CK is supplied to the slope circuit 8 and the step-up drive circuit 10.

The slope circuit 8 uses the clock signal CK to generate a triangular wave or sawtooth wave slope voltage $V_{SLP}$. The slope of the slope voltage $V_{SLP}$ is variable depending on a voltage supplied to the terminal IS, that is, a source voltage of the NMOS transistor M1.

The comparator 9 compares the error voltage $V_{ERR}$ and the slope voltage $V_{SLP}$ and supplies the comparison result to the step-up drive circuit 10.

The step-up drive circuit 10 generates a gate signal of the NMOS transistor M1 based on the clock signal CK and the output of the comparator 9, and supplies the same to the gate of the NMOS transistor M1 via the terminal GL.

With the circuit configuration as described above, the DC/DC converter is feedback-controlled such that an output current $I_{OUT}$ of the DC/DC converter approaches a target current.

The current-limiting circuit 13 outputs a voltage $V_{LIM}$ based on the overcurrent limit value OCLIM. The adder 14 supplies a voltage obtained by adding the DC dimming voltage $V_{DCDIM}$ and the voltage $V_{LIM}$, to the inverting input terminal of the operational amplifier 11 and the inverting input terminal of the comparator 12.

The operational amplifier 11 outputs a voltage corresponding to a difference between the feedback voltage $V_{FB}$ and the output voltage of the adder 14. The minimum value of the output voltage of the operational amplifier 11 is smaller than a voltage applied to the terminal SNSP by 7.5 V. The maximum value of the output voltage of the operational amplifier 11 is the same value as the voltage applied to the terminal SNSP.

The output terminal of the operational amplifier 11 is connected to the terminal PGATE via the resistor R7. When the switch 17 is turned off, the PMOS transistor M2 is linearly controlled by the output voltage of the operational amplifier 11.

The comparator 12 compares the feedback voltage $V_{FB}$ with the output voltage (threshold value setting voltage) of the adder 14 and controls the switch 17 according to the comparison result. When the output voltage (threshold value setting voltage) of the adder 14 is larger than the feedback voltage $V_{FB}$ when the switch 17 is turned on, the comparator 12 switches the switch 17 from on to off.

The PWM circuit 15 generates a PWM dimming voltage $V_{PWMDIM}$ whose duty value is the duty value D, and supplies the PWM dimming voltage $V_{PWMDIM}$ to the inverter 16. The inverter 16 outputs an inverted signal of the PWM dimming voltage $V_{PWMDIM}$. When an output voltage of the inverter 16 is at a HIGH level, the value of the output voltage of the inverter 16 is the same value as the voltage applied to the terminal SNSP. When the output voltage of the inverter 16 is at a LOW level, the value of the output voltage of the inverter 16 is smaller than the voltage applied to the terminal SNSP by 7.5 V.

The output terminal of the inverter 16 is connected to the terminal PGATE via the switch 17. When the switch 17 is turned on, the switching control is performed on the PMOS transistor M2 by the output voltage of the inverter 16.

The non-inverting input terminal of the comparator 18 is connected to the terminal PGATE. A reference voltage $V_{REF}$ generated with a value, which is smaller than the voltage applied to the terminal SNSP by 7.5 V, as a reference, is supplied to the inverting input terminal of the comparator 18. The comparator 18 compares an output voltage of the terminal PGATE with the reference voltage $V_{REF}$ and controls the switch 17 according to the comparison result. When the output voltage of the terminal PGATE is smaller than the reference voltage $V_{REF}$ when the switch 17 is turned off, the comparator 18 switches the switch 17 from off to on.

FIG. 2 is a diagram showing a configuration example of the switches SW0 to SW7 and the switch control circuit 300. In the configuration example shown in FIG. 2, the switches SW0 to SW7 are NMOS transistors, respectively. A switch SWk (k is an integer of 0 or more and 7 or less) is connected in parallel to a light-emitting diode Zk. When the switch SWk is turned off, a current flows through the light-emitting diode Zk. On the other hand, when the switch SWk is turned on, no current flows through the light-emitting diode Zk.

The switch control circuit 300 controls turn-on/off of the switches SW0 to SW7. The switch control circuit 300 controls lighting state of the light-emitting diodes Z0 to Z7 by controlling the turn-on/off of the switches SW0 to SW7.

The switch control circuit 300 and the logic circuit 2 are not communicating with each other. Therefore, the logic circuit 2 does not grasp how the switch control circuit 300 controls the lighting state of the light-emitting diodes Z0 to Z7.

Figure 3:
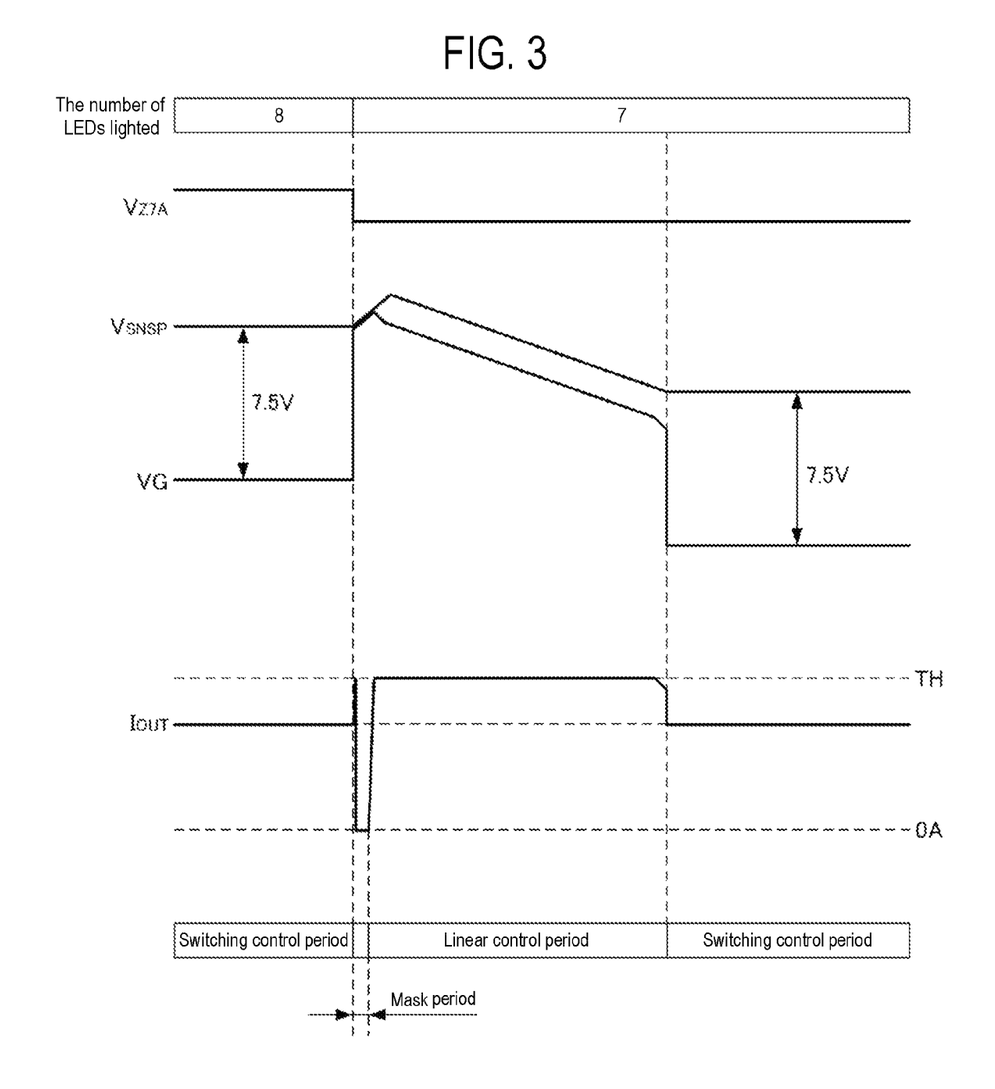
FIG. 3 is a time chart showing waveforms of voltages and the like of various parts of the light-emitting device shown in FIG. 1.

FIG. 3 is a time chart showing waveforms of voltages and the like of various parts of the light-emitting device shown in FIG. 1. FIG. 3 is a time chart from when all of the switches SW0 to SW7 are turned off to when any one of the switches SW0 to SW7 is turned on.

When the number of light-emitting diodes Z0 to Z7 that are lighted decreases from 8 to 7, the anode voltage $V_{Z7A}$ of the light-emitting diode Z7 decreases and the output current $I_{OUT}$ of the above-mentioned DC/DC converter reaches a threshold value TH. The threshold value TH corresponds to the output voltage (threshold value setting voltage) of the adder 14.

When the output current $I_{OUT}$ of the above-mentioned DC/DC converter reaches the threshold value TH, the switch 17 is switched from on to off by the output voltage of the comparator 12. This ends a switching control period.

Further, the logic circuit 2 monitors the state of the switch 17, and in a period (mask period) until a predetermined time elapses from when the switch 17 is switched from on to off, the outputting of the current set value ISETX and the overcurrent limit value OCLIM is stopped. As a result, during the mask period, the value of the gate voltage VG of the PMOS transistor M2 becomes the same value as a voltage $V_{SNSP}$ supplied to the terminal SNSP, and the PMOS transistor M2 is turned off. When the PMOS transistor M2 is turned off, the output current $I_{OUT}$ of the above-mentioned DC/DC converter becomes zero.

By providing the mask period, an overshoot of the output current $I_{OUT}$ of the above-mentioned DC/DC converter may be reliably prevented.

When the mask period ends, a linear control period starts. During the linear control period, the PMOS transistor M2 is linearly controlled by the output voltage of the operational amplifier 11. Since the source-drain resistance of the PMOS transistor M2 in the linear control period is larger than the source-drain resistance of the PMOS transistor M2 in the switching control period, it is possible to prevent the output current $I_{OUT}$ of the above-mentioned DC/DC converter from becoming a rush current. That is, the light-emitting device shown in FIG. 1 may prevent a large current from flowing through a light-emitting diode to be supplied with a current, among the light-emitting diodes Z0 to Z7.

When the output voltage of the terminal PGATE becomes smaller than the reference voltage $V_{REF}$, the linear control period ends and the switching control period starts. As a result, the light-emitting device shown in FIG. 1 may automatically return to the switching control.

Figure 4:
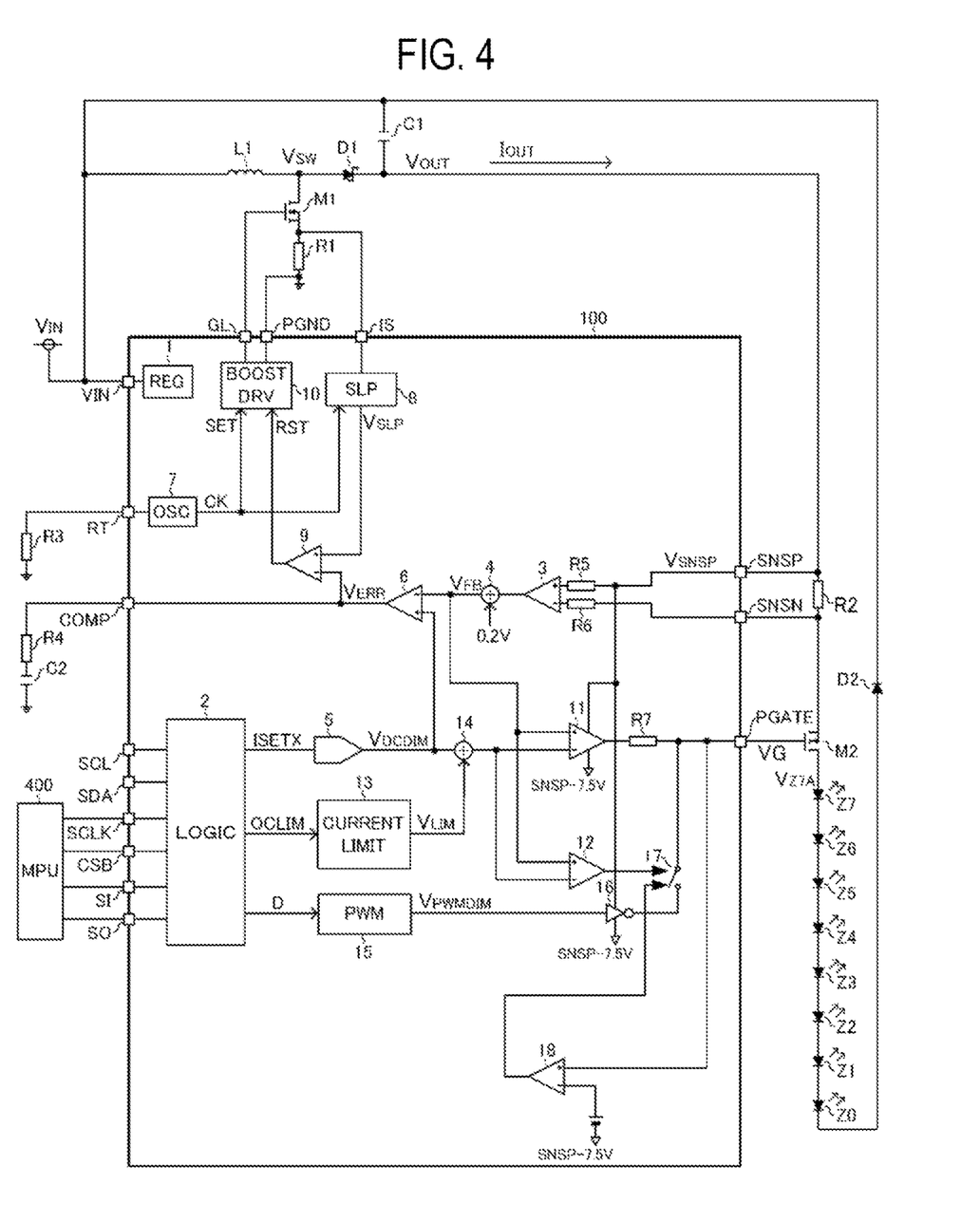
FIG. 4 is a diagram showing another configuration example of the light-emitting device.

FIG. 4 is a diagram showing another configuration example of the light-emitting device. The light-emitting device shown in FIG. 4 is different from the light-emitting device shown in FIG. 1 in that the former is provided with an MPU (Micro Processor Unit) 400 instead of the EEPROM 200, and has the same configuration as the light-emitting device shown in FIG. 1 in other respects. The logic circuit 2 of the light-emitting device shown in FIG. 4 performs dimming control and the like based on the settings sent from the MPU 400.

Figure 5:
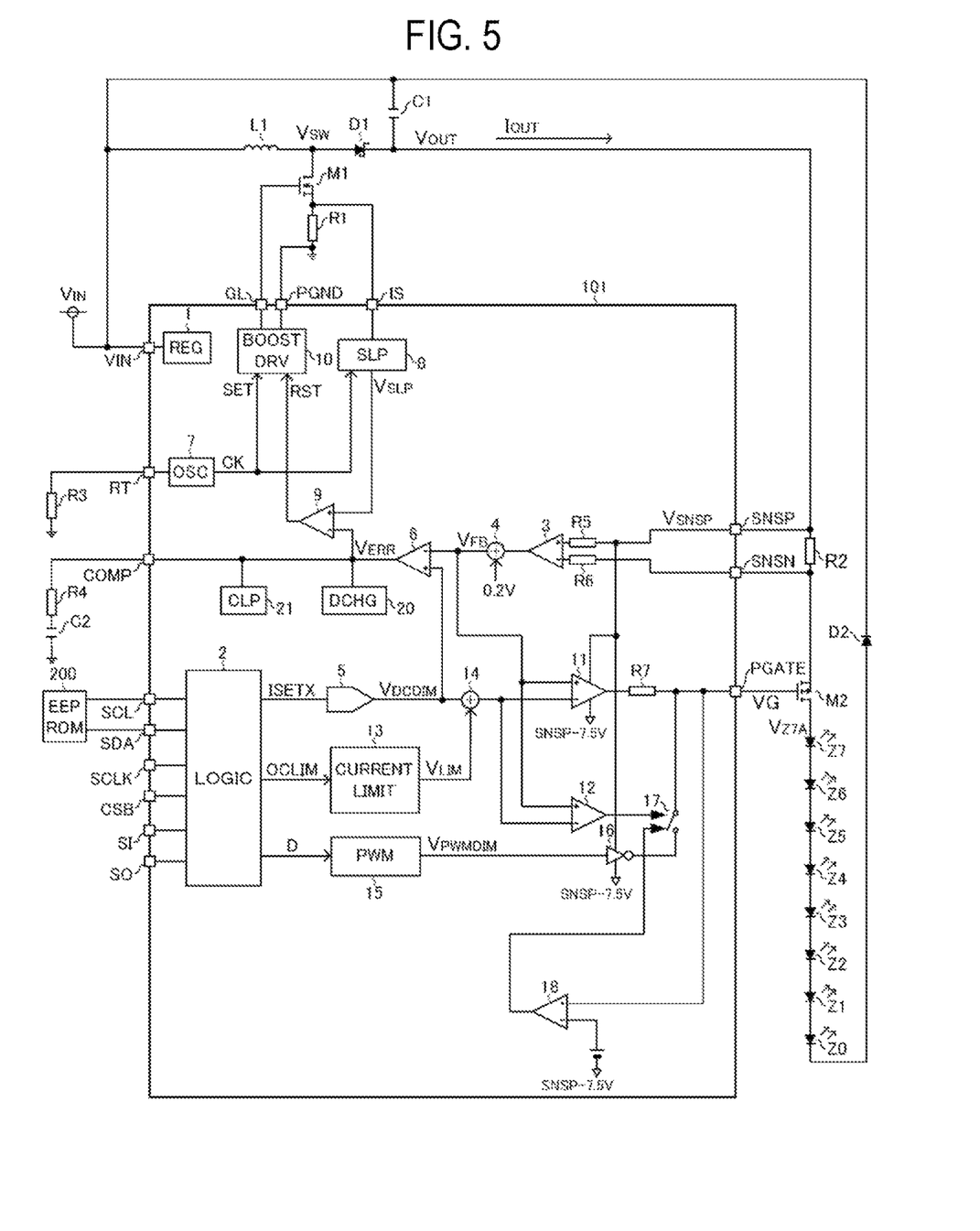
FIG. 5 is a diagram showing still another configuration example of the light-emitting device.

FIG. 5 is a diagram showing another configuration example of the light-emitting device. The light-emitting device shown in FIG. 5 is different from the light-emitting device shown in FIG. 1 in that the former is provided with a light-emitting element driving IC 101 instead of the light-emitting element driving IC 100, and has the same configuration as the light-emitting device shown in FIG. 1 in other respects.

The light-emitting element driving IC 101 has a configuration in which a discharge circuit 20 and a clamp element 21 are added to the light-emitting element driving IC 100.

The discharge circuit 20 draws a current from the output terminal of the error amplifier 6 during the linear control period. As a result, the error voltage $V_{ERR}$ decreases in the linear control period in which the value of the source-drain resistance of the PMOS transistor M2 is larger than that in the switching control period. When the error voltage $V_{ERR}$ decreases, the step-up drive circuit 10 controls the switching of the NMOS transistor M1 such that the output current $I_{OUT}$ of the above-mentioned DC/DC converter decreases. As a result, the light-emitting device shown in FIG. 5 may suppress a loss in the PMOS transistor M2 during the linear control period.

The value of the current drawn by the discharge circuit 20 is not particularly limited. For example, the value of the current drawn by the discharge circuit 20 is set based on the control state of the terminal PGATE. In that case, the discharge circuit 20 may include a current mirror circuit to draw a mirror current of a current, which flows through the terminal PGATE, from the output terminal of the error amplifier 6. Further, for example, the discharge circuit 20 may include a constant current circuit to draw a constant current from the output terminal of the error amplifier 6. Further, for example, the discharge circuit 20 may include a variable current circuit, may set the value of an output current of the variable current circuit based on a circuit constant of a discrete component connected externally, an output signal of the logic circuit 2, and the like, and may draw the output current of the variable current circuit from the output terminal of the error amplifier 6.

The clamp element 21 clamps the lower limit of the error voltage $V_{ERR}$. As the clamp element 21, for example, a Zener diode or the like may be used. In a case where the error voltage $V_{ERR}$ is lowered too much due to the current drawn by the discharge circuit 20, the output current $I_{OUT}$ of the above-mentioned DC/DC converter may be insufficient when light-emitting element driving IC 101 returns to the switching control. By providing the clamp element 21, it is possible to prevent the output current $I_{OUT}$ of the DC/DC converter from becoming insufficient when light-emitting element driving IC 101 returns to the switching control.

<Application>

Figure 6:
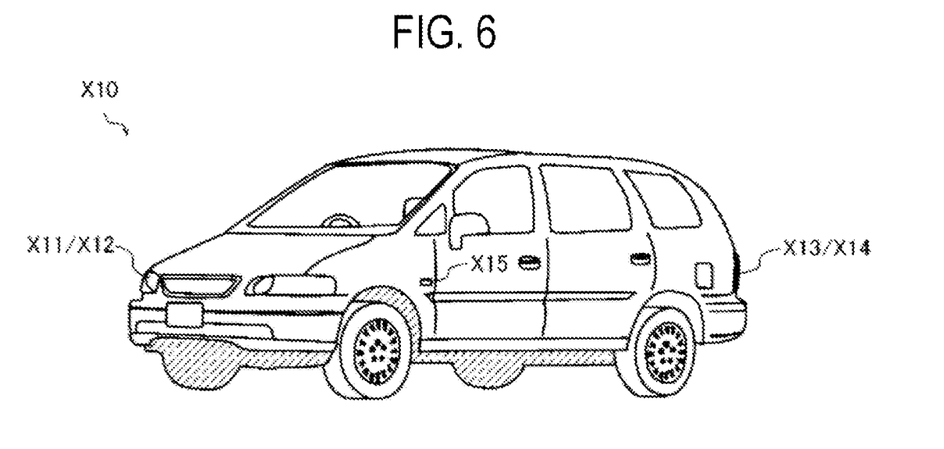
FIG. 6 is an external (front) view of a vehicle equipped with the light-emitting device.
Figure 7:
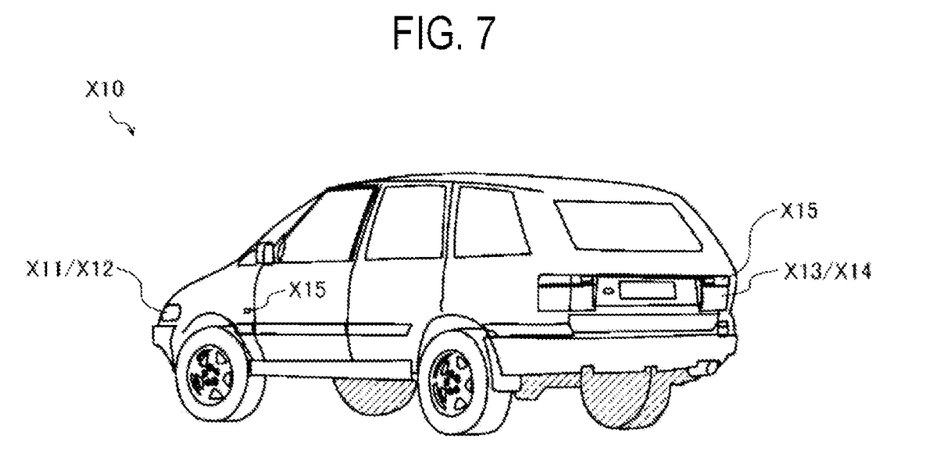
FIG. 7 is an external (rear) view of the vehicle equipped with the light-emitting device.

As shown in FIGS. 6 and 7, for example, the above-mentioned light-emitting device may be suitably used as a headlight (appropriately including a high beam, a low beam, a small lamp, a fog lamp, and the like) X11, a light source X12 for daytime running lights (DRL), a tail lamp (appropriately including a small lamp, a back lamp, and the like) X13, a stop lamp X14, a turn lamp X15, and the like of a vehicle X10.

Figure 8:
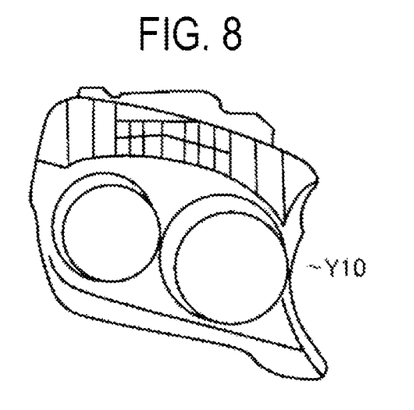
FIG. 8 is an external view of an LED headlight module.
Figure 9:
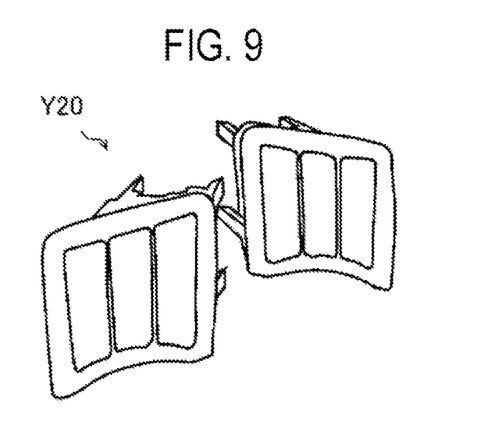
FIG. 9 is an external view of an LED turn lamp module.
Figure 10:
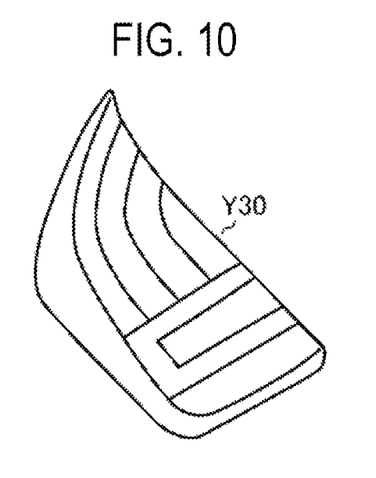
FIG. 10 is an external view of an LED rear lamp module.

The above-mentioned light-emitting device may be provided as modules (LED headlight module Y10 in FIG. 8, LED turn lamp module Y20 in FIG. 9, LED rear lamp module Y30 in FIG. 10, and the like). Further, it may be provided in the form of a drive device with a light-emitting number control function which is a semi-finished product in which the light-emitting diodes, external components of the light-emitting element driving IC, and the like are removed from the above-mentioned light-emitting device.

<Others>

It should be considered that the above embodiments are exemplary in all respects and are not restrictive. It should be understood that the technical scope of the present disclosure is indicated by the claims rather than the description of the above embodiments and includes all modifications that fall within the meaning and scope equivalent to the claims.

In the above embodiments, the configuration using the light-emitting diode as the light-emitting element has been described as an example, but the configuration of the present disclosure is not limited thereto. For example, it is also possible to use an organic EL (Electro Luminescence) element as the light-emitting element.

In the above embodiments, the configuration using the PMOS transistor as the transistor connected in series to the light-emitting diode has been described as an example, but the configuration of the present disclosure is not limited thereto. For example, a bipolar transistor may be used instead of the PMOS transistor M2.

In the above embodiments, the light-emitting device is configured to include the light-emitting element driving IC 100, but for example, a portion corresponding to the light-emitting element driving IC 100 may be configured with a plurality of ICs.

The light-emitting element driving semiconductor integrated circuit (100) as described above is a light-emitting element driving semiconductor integrated circuit that constitutes at least portion of a light-emitting element driving device configured to drive a plurality of light-emitting elements (Z0 to Z7) connected in series. The light-emitting element driving semiconductor integrated circuit (100) is configured to include a controller (11, 12, 16, 17, R7) configured to have a first mode in which switching control is performed on a transistor (M2) connected in series to the plurality of light-emitting elements and a second mode in which linear control is performed on the transistor, and a first detector (12) configured to detect that a current flowing through a sense resistor (R2) connected in series to the plurality of light-emitting elements and the transistor reaches a threshold value, wherein the controller switches from the switching control to the linear control based on an output of the first detector (first configuration).

The light-emitting element driving semiconductor integrated circuit of the first configuration may suppress a large current from flowing through the light-emitting elements.

The light-emitting element driving semiconductor integrated circuit of the first configuration may be configured to further include a second detector (18) configured to detect that a gate-source voltage or a base current of the transistor reaches a predetermined value, wherein the controller switches from the linear control to the switching control based on an output of the second detector (second configuration).

The light-emitting element driving semiconductor integrated circuit of the second configuration may automatically return to the switching control.

The light-emitting element driving semiconductor integrated circuit of the first or second configuration may be configured such that, when the controller switches from the switching control to the linear control, the controller transitions from a switching control period during which the switching control is performed to a linear control period during which the linear control is performed, via a mask period during which the transistor is turned off (third configuration).

The light-emitting element driving semiconductor integrated circuit of the third configuration may reliably prevent an overshoot of the current flowing through the sense resistor.

The light-emitting element driving semiconductor integrated circuit of any one of the first to third configurations may be configured such that the light-emitting element driving device includes a DC/DC converter configured to convert an input voltage into an output voltage, and a switching controller (8, 9, 10) configured to control a switching element in the DC/DC converter based on an error voltage output from an error amplifier (6) configured to amplify a difference between a first voltage and a second voltage corresponding to a target current based on an output current of the DC/DC converter, wherein the light-emitting element driving device is configured to supply the output current of the DC/DC converter to the sense resistor, and the light-emitting element driving semiconductor integrated circuit further includes a discharger (20) configured to draw a current from an output terminal of the error amplifier when the controller performs the linear control (fourth configuration).

The light-emitting element driving semiconductor integrated circuit of the fourth configuration may suppress a loss in the transistor.

The light-emitting element driving semiconductor integrated circuit of the fourth configuration may be configured to further include a clamp element (21) configured to clamp a lower limit of the error voltage (fifth configuration).

The light-emitting element driving semiconductor integrated circuit of the fifth configuration may prevent the current flowing through the sense resistor from being insufficient when switching from the linear control to the switching control is performed.

The light-emitting element driving device as described above is a light-emitting element driving device configured to drive a plurality of light-emitting elements connected in series. The light-emitting element driving device is configured to include a transistor (M2) connected in series to the plurality of light-emitting elements, a controller (11, 12, 16, 17, R7) configured to have a first mode in which switching control is performed on the transistor and a second mode in which linear control is performed on the transistor, a sense resistor (R2) connected in series to the plurality of light-emitting elements and the transistor, and a first detector (12) configured to detect that a current flowing through the sense resistor reaches a threshold value, wherein the controller switches from the switching control to the linear control based on an output of the first detector (sixth configuration).

The light-emitting element driving device of the sixth configuration may suppress a large current from flowing through the light-emitting elements.

The light-emitting device as described above is configured to include the light-emitting element driving device of the sixth configuration, and the plurality of light-emitting elements (Z0 to Z7) (seventh configuration).

The light-emitting device of the seventh configuration may suppress a large current from flowing through the light-emitting elements.

The vehicle as described above is configured to include the light-emitting device of the seventh configuration (eighth configuration).

The vehicle (X10) of the eighth configuration may suppress a large current from flowing through the light-emitting elements.

According to the light-emitting element driving semiconductor integrated circuit, the light-emitting element driving device, the light-emitting device, and the vehicle disclosed in the present disclosure, it is possible to suppress a large current from flowing through light-emitting elements.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A light-emitting element driving semiconductor integrated circuit that constitutes at least a portion of a light-emitting element driving device configured to drive a plurality of light-emitting elements connected in series, comprising:
   a controller configured to have a first mode in which switching control is performed on a transistor connected in series to the plurality of light-emitting elements and a second mode in which linear control is performed on the transistor; and a first detector configured to detect that a current flowing through a sense resistor connected in series to the plurality of light-emitting elements and the transistor reaches a threshold value, wherein the controller switches from the switching control to the linear control based on an output of the first detector.

2. The light-emitting element driving semiconductor integrated circuit of claim 1, further comprising a second detector configured to detect that a gate-source voltage or a base current of the transistor reaches a predetermined value, wherein the controller switches from the linear control to the switching control based on an output of the second detector.

3. The light-emitting element driving semiconductor integrated circuit of claim 1, wherein, when the controller switches from the switching control to the linear control, the controller transitions from a switching control period during which the switching control is performed to a linear control period during which the linear control is performed, via a mask period during which the transistor is turned off.

4. The light-emitting element driving semiconductor integrated circuit of claim 1, wherein the light-emitting element driving device includes a DC/DC converter configured to convert an input voltage into an output voltage, and a switching controller configured to control a switching element in the DC/DC converter based on an error voltage output from an error amplifier configured to amplify a difference between a first voltage and a second voltage corresponding to a target current based on an output current of the DC/DC converter, wherein the light-emitting element driving device is configured to supply the output current of the DC/DC converter to the sense resistor, and wherein the light-emitting element driving semiconductor integrated circuit further comprises a discharger configured to draw a current from an output terminal of the error amplifier when the controller performs the linear control.

5. The light-emitting element driving semiconductor integrated circuit of claim 4, further comprising a clamp element configured to clamp a lower limit of the error voltage.

6. A light-emitting element driving device configured to drive a plurality of light-emitting elements connected in series, comprising:

a transistor connected in series to the plurality of light-emitting elements;

a controller configured to have a first mode in which switching control is performed on the transistor and a second mode in which linear control is performed on the transistor;

a sense resistor connected in series to the plurality of light-emitting elements and the transistor; and a first detector configured to detect that a current flowing through the sense resistor reaches a threshold value, wherein the controller switches from the switching control to the linear control based on an output of the first detector.

7. A light-emitting device comprising:

the light-emitting element driving device of claim 6; and the plurality of light-emitting elements.

8. A vehicle comprising the light-emitting device of claim 7.

* * * * *